(12) United States Patent
Hwang

(10) Patent No.: US 7,738,462 B2
(45) Date of Patent: Jun. 15, 2010

(54) METHOD AND APPARATUS FOR PROCESSING DATA IN CONTROLLER AREA NETWORK

(75) Inventor: Hee Chang Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 367 days.

(21) Appl. No.: 11/580,860

(22) Filed: Oct. 16, 2006

(65) Prior Publication Data

US 2007/0091932 A1    Apr. 26, 2007

(30) Foreign Application Priority Data

Oct. 17, 2005    (KR) ...................... 10-2005-0097454

(51) Int. Cl.
*H04L 12/28* (2006.01)
*H04L 12/56* (2006.01)

(52) U.S. Cl. .............................. 370/395.1; 370/395.52; 370/389; 709/233

(58) Field of Classification Search ................. 370/475, 370/359, 503, 509, 510, 511, 512, 514, 516, 370/354, 356, 364–366; 709/233
See application file for complete search history.

(56) References Cited

U.S. PATENT DOCUMENTS

| | | | | | |
|---|---|---|---|---|---|
| 5,677,704 | A | * | 10/1997 | Kusano et al. ................ | 345/89 |
| 6,233,251 | B1 | * | 5/2001 | Kurobe et al. ............... | 370/471 |
| 2001/0024445 | A1 | * | 9/2001 | Noda et al. .................. | 370/402 |
| 2005/0010759 | A1 | * | 1/2005 | Wakiyama .................. | 713/160 |
| 2005/0289224 | A1 | * | 12/2005 | Deslippe et al. ............. | 709/208 |
| 2008/0043760 | A1 | * | 2/2008 | Venkatraman et al. ...... | 370/401 |

\* cited by examiner

*Primary Examiner*—Huy D Vu
*Assistant Examiner*—Omer Mian
(74) *Attorney, Agent, or Firm*—Birch, Stewart, Kolasch & Birch, LLP

(57) ABSTRACT

A method and apparatus for processing data in a Controller Area Network (CAN) are discussed. In an embodiment of this invention, dummy data is added to data to be transmitted via a CAN message, and information indicating that the dummy data is added is transmitted via the CAN message. A length of the dummy data is determined such that data to be transmitted via the CAN message becomes a predetermined length, and data in which five or more successive bits do not have a same value is added as the dummy data. The information is included in a field indicating a length of data to be transmitted via the CAN message, and is indicated by a value within a reserved range of the field. Accordingly, data processing efficiency can be improved, and flexible CAN communication can be performed via the CAN message.

16 Claims, 5 Drawing Sheets

| Number of Data Bytes | Data Length Code | | | |
|---|---|---|---|---|
| | DLC3 | DLC2 | DLC1 | DLC0 |
| 0 | 0(d) | 0(d) | 0(d) | 0(d) |
| 1 | 0(d) | 0(d) | 0(d) | 1(r) |
| 2 | 0(d) | 0(d) | 1(r) | 0(d) |
| 3 | 0(d) | 0(d) | 1(r) | 1(r) |
| 4 | 0(d) | 1(r) | 0(d) | 0(d) |
| 5 | 0(d) | 1(r) | 0(d) | 1(r) |
| 6 | 0(d) | 1(r) | 1(r) | 0(d) |
| 7 | 0(d) | 1(r) | 1(r) | 1(r) |
| 8 | 1(r) | 0(d) | 0(d) | 0(d) |
| 1 + padding 7 | 1(r) | 0(d) | 0(d) | 1(r) |
| 2 + padding 6 | 1(r) | 0(d) | 1(r) | 0(d) |
| 3 + padding 5 | 1(r) | 0(d) | 1(r) | 1(r) |
| 4 + padding 4 | 1(r) | 1(r) | 0(d) | 0(d) |
| 5 + padding 3 | 1(r) | 1(r) | 0(d) | 1(r) |
| 6 + padding 2 | 1(r) | 1(r) | 1(r) | 0(d) |
| 7 + padding 1 | 1(r) | 1(r) | 1(r) | 1(r) |

FIG. 1 RELATED ART

[CAN Message Structure]

| 11 or 29 bits | 4 bits | 1 Byte | 1 Byte | 1 Byte | 1 Byte | 1 Byte | 1 Byte | 1 Byte | 1 Byte |
|---|---|---|---|---|---|---|---|---|---|

CAN ID/Priority | DLC | DATA Frame

FIG. 2 RELATED ART

| Number of Data Bytes | Data Length Code | | | |
|---|---|---|---|---|
| | DLC3 | DLC2 | DLC1 | DLC0 |
| 0 | 0(d) | 0(d) | 0(d) | 0(d) |
| 1 | 0(d) | 0(d) | 0(d) | 1(r) |
| 2 | 0(d) | 0(d) | 1(r) | 0(d) |
| 3 | 0(d) | 0(d) | 1(r) | 1(r) |
| 4 | 0(d) | 1(r) | 0(d) | 0(d) |
| 5 | 0(d) | 1(r) | 0(d) | 1(r) |
| 6 | 0(d) | 1(r) | 1(r) | 0(d) |
| 7 | 0(d) | 1(r) | 1(r) | 1(r) |
| 8 | 1(r) | 0(d) | 0(d) | 0(d) |

FIG. 3

| Number of Data Bytes | Data Length Code | | | |
|---|---|---|---|---|
| | DLC3 | DLC2 | DLC1 | DLC0 |
| 0 | 0(d) | 0(d) | 0(d) | 0(d) |
| 1 | 0(d) | 0(d) | 0(d) | 1(r) |
| 2 | 0(d) | 0(d) | 1(r) | 0(d) |
| 3 | 0(d) | 0(d) | 1(r) | 1(r) |
| 4 | 0(d) | 1(r) | 0(d) | 0(d) |
| 5 | 0(d) | 1(r) | 0(d) | 1(r) |
| 6 | 0(d) | 1(r) | 1(r) | 0(d) |
| 7 | 0(d) | 1(r) | 1(r) | 1(r) |
| 8 | 1(r) | 0(d) | 0(d) | 0(d) |
| 1 + padding 7 | 1(r) | 0(d) | 0(d) | 1(r) |
| 2 + padding 6 | 1(r) | 0(d) | 1(r) | 0(d) |
| 3 + padding 5 | 1(r) | 0(d) | 1(r) | 1(r) |
| 4 + padding 4 | 1(r) | 1(r) | 0(d) | 0(d) |
| 5 + padding 3 | 1(r) | 1(r) | 0(d) | 1(r) |
| 6 + padding 2 | 1(r) | 1(r) | 1(r) | 0(d) |
| 7 + padding 1 | 1(r) | 1(r) | 1(r) | 1(r) |

METHOD AND APPARATUS FOR PROCESSING DATA IN CONTROLLER AREA NETWORK

This application claims the priority benefit of Korean Patent Application No. 10-2005-0097454, filed on Oct. 17, 2005, which is hereby incorporated by reference for all purposes as if fully set forth herein.

BACKGROUND OF THE INVENTION

1. Field of the Invention

The present invention relates generally to a controller area network and, more particularly, to a method and apparatus for padding a data frame with data using the data length code of a controller area network message.

2. Description of the Related Art

In the case where automobile electronic components are managed using an existing analog control method, bundles of electrical wires used for optional vehicle components, such as an AV system and a navigation system, are disposed in a vehicle in a disorderly fashion. Such bundles of thick electrical wires are a main cause of an increase in the weight of the vehicle and trouble with the electronic system of the vehicle.

Currently, it is necessary to make on-board electronic control devices, such as an engine management Electronic Control Unit (ECU), a transmission ECU, a ABS system and an air-bag system, which are provided in an automobile, to be able to share information and an increasing number of vehicle sensors therebetween, to provide a communication method that is robust to a noisy vehicle environment, and to connect the ECUs, having independent characteristics via a network.

A Controller Area Network (CAN) is a vehicle network system developed by Bosch Co. in Germany in order to solve the problem with vehicle wiring, which is becoming more and more complicated as time goes by, and functions to exchange information between on-board electronic control devices, which are responsible for an engine management device, a transmission device, and vehicle body electronic devices related to a breaking system, an airbag, an instrument cluster, lamps, and an air conditioner, which are provided in the vehicle.

Peripheral devices provided in the vehicle are connected to a single network (CAN) and exchange data in a serial communication manner, so that they are robust to harsh environmental factors, such as heat and noise, can attain a fast data transmission rate of 1 Mbit/s at a maximum, and can improve data reliability through error processing.

FIG. 1 is a diagram showing the structure of a CAN message that is defined in the current CAN standard. As shown in FIG. 1, the CAN message includes an 11 or 29-bit CAN Identifier (ID)/priority, a 4-bit Data Length Code (DLC), and an 8-byte data frame.

FIG. 2 is a diagram showing a data length code field in the CAN message that is defined in the current CAN standard, and shows the relationship between the length of data, which is included in the data frame of the CAN message, and data length code values. In FIG. 2, the data length code uses a 4-bit code value to represent the number of bytes of data that will be included in the data frame area of a maximum of 8 bytes.

The length of data transmitted via the CAN message depends on the value of the data length code field. In this case, the maximum number of bytes of data that can be included in the data frame of the CAN message is 8 bytes, so that values within the range from b0000(0) to b1000(8) are used for the data length code. For example, when the value of the data length code field is b0010(2), the length of data in the CAN message is 2 bytes.

However, the length of data in the CAN message can be represented by various numbers of bytes ranging from 0 to 8 bytes, so that consistent transmission time cannot be ensured at the time of transmission of data, and a reception side cannot predict the length of data to be transmitted. Therefore a problem occurs in that data processing efficiency is low at transmitting and receiving ends.

SUMMARY OF THE INVENTION

Accordingly, the present invention has been made keeping in mind the above and other problems occurring in the related art, and an object of the present invention is to provide a method and apparatus for improving data processing efficiency via a CAN message.

Another object of the present invention is to provide a method and apparatus for predicting the length of data to be transmitted via the CAN message.

Another object of the present invention is to provide a method and apparatus for processing data in a CAN, which address the limitations and disadvantages associated with the related art.

In order to accomplish the above and other objects, the present invention provides according to an embodiment a method of processing data in a CAN, the method including the steps of adding second data to first data to be transmitted via a CAN message; and transmitting information, indicating that the second data has been added, via the CAN message.

According to an embodiment, the length of the added second data is a value that is determined such that a sum of the lengths of the first data and the second data is a predetermined length. The predetermined length is 8 bytes.

According to an embodiment, the second data is data in which there are not five or more successive bits having an identical value. When one or more bytes having an identical value are added, the first bit of the second data may have a value different from the last bit of the first data, and first and last bits in each byte may have different values, first and fifth bits in each byte may have different values, and fourth and last bits in each byte may have different values. For example, each of the bytes of the second data may have a value of 0x0F or 0xF0.

Furthermore, according to an embodiment, the information is included in a field indicating the length of data to be transmitted via the CAN message. The information is indicated by a value within a reserved range of the field. Furthermore, the length of the first data corresponds to a value of lower bits that remain after a Most Significant Bit (MSB) is subtracted from a value within the reserved range of the field.

In addition, the present invention provides according to an embodiment a method of processing data in a CAN, the method including the steps of determining the length of first data to be transmitted via a CAN message based on information included in the received CAN message; and receiving first data corresponding to the determined length; wherein, when the information indicates that second data has been added to the first data, the method further comprises the step of extracting only data except the second data from the received first data.

In addition, the present invention provides according to an embodiment an apparatus for processing data in a CAN, the apparatus including a CAN controller for generating a CAN message including data to be transmitted and transmitting the generated CAN message through a CAN bus, or receiving the CAN message transmitted through the CAN bus and extracting data from the received CAN message; and a micro-controller for transmitting data through the CAN controller, or performing the operational control of corresponding devices using the data extracted from the received CAN message; wherein, in an embodiment, the CAN controller selectively adds second data when transmitting first data via the CAN message, and transmits information indicating that the second data has been added via the CAN message when adding the second data to the first data, or wherein, in another embodiment, the CAN controller determines the length of first data to be transmitted via the CAN message based on information included in the received CAN message, receives a number of bytes of first data equal to the determined length, and, when the information indicates that second data has been added to the first data, extracts data except the second data from the received first data.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more clearly understood from the following detailed description taken in conjunction with the accompanying drawings, in which:

FIG. 1 is a diagram showing the structure of a CAN message that is defined in a CAN standard;

FIG. 2 is a diagram showing a data length code field in the CAN message that is defined in the current CAN standard according to a related art;

FIG. 3 is a diagram showing a data length code field in a CAN message according to the present invention;

DETAILED DESCRIPTION OF PREFFERRED EMBODIMENTS

Preferred embodiments of a method and apparatus for processing data in a CAN are described in detail with reference to the accompanying drawings below.

FIG. 3 is a diagram showing a data length code field in a CAN message to which a data processing method according to the present invention is applied. The CAN message is a message used in a CAN of a vehicle or other suitable environment.

The CAN message is used to transmit information about the number of bytes of data, which is included in a data frame, by using a 4-bit data length code field as shown in, e.g., FIG. 1. Furthermore, the data frame of the CAN message enables the transmission of a maximum of 8 bytes of data. Accordingly, in the related art, for the 4-bit data length code field, code values within the range from b0000(0) to b1000(8) are used, and code values within the range from b1001 to b1111 are not used.

The present invention, however, uses the code values within the range from b1001 to b1111 (which are not used in the current CAN standard) in the data length code field, so that data having a predetermined length can be included in a data field regardless of the actual length of data transmitted via the CAN message.

In an embodiment of the present invention, any of the code values within the range from b1001 to b1111 can be used in the data length code field of the CAN message when the 8 bytes of data, which include n bytes of actual data, corresponding to a lower 3-bit code value, and remaining (8-n) bytes of dummy data, in the data frame are transmitted.

That is, according to an embodiment of the present invention, when actual data (data having any length from 1 to 7 bytes), not having a length of 8 bytes, is transmitted, dummy data, having any length from 1 to 7 bytes, may be used for padding so that data transmitted through the data frame has a fixed length of 8 bytes always.

Furthermore, according a related art method, code values within the range from b0000(0) to b1000(8), corresponding to the number of bytes of actual data included in the data field, are used for the data length code field, so that a CAN message in which only actual data is included in the data field can be transmitted.

However, in FIG. 3 according to the present invention, code values within the range from b0000(0) to b1000(8), as defined in the CAN standard, are values used when transmitting data using a no-padding policy. Furthermore, code values within the range from b1001 to b1111, which are indicated by "x+padding y", are values reserved for the CAN standard, and are values that are newly defined to transmit data according to a padding policy in the present invention.

Figure 4:
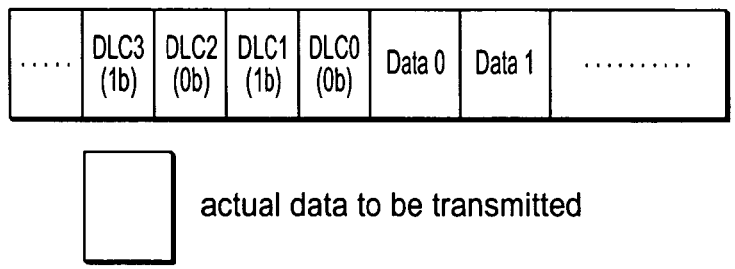
FIG. 4 is a diagram showing the data length code field and data frame of a CAN message transmitted according to a no-padding policy.

When data is transmitted using a related art method, which uses the no-padding policy according to a user's selection, the code value of the data length code field of a CAN message is determined by a value that falls within b0000(0)-b1000(8) and corresponds to the number of bytes of data included in the data frame. For example, as shown in FIG. 4, when the code value of the data length code field is b0010(2), the length of data in a CAN data frame is considered to be 2 bytes.

In contrast, when data is transmitted using the method of the present invention, which uses the padding policy according to the user's selection, the code value of the data length code field is determined by a value that falls within b1001(1+Padding 7)-b1111(7+Padding 1) and corresponds to the number of bytes of actual data included in the data frame.

Figure 5:
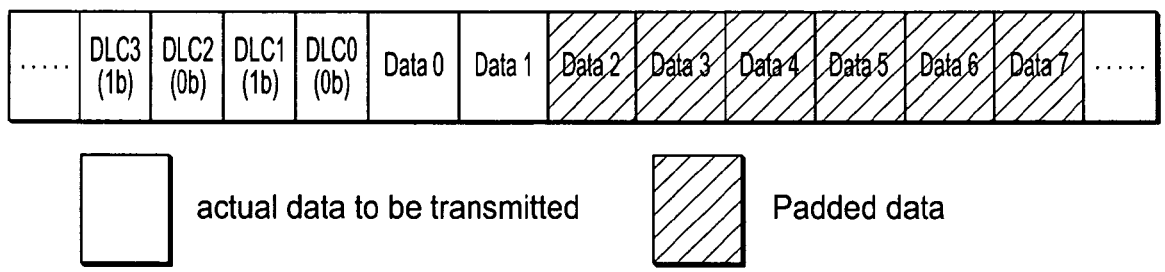
FIG. 5 is a diagram showing the data length code field and data frame of a CAN message transmitted according to a padding policy, according to the present invention.

The length of the data frame in a CAN message is generally always 8 bytes. As shown in FIG. 5, when the code value of the data length code field of the CAN message is b1010(2+Padding 6), the length of actual data is determined to be 2 bytes even though the length of the data frame of the CAN message is 8 bytes, and thus padding data is determined to occupy the remaining 6 bytes of the data frame of the CAN message.

Meanwhile, according to the current CAN standard, 6 successive bits having the same bit value cannot be successively transmitted. Therefore, if 5 successive bits have the same value when data is transmitted through a CAN bus, a different bit is added to the 5 successive bits (bit stuffing).

At the time of transmission of data using the padding policy according to the present invention, in order to prevent the bit stuffing due to the successive occurrence of five or more bits having the same value, i) the value of the first bit of the first byte to be padded is set to be different from that of the last bit of actual data, and ii) data to be used for padding is set so that four or less successive bits have the same value.

In order to perform a simple data padding operation without a special operation (an operation for counting the number of successive bits having the same value), it is advantageous to pad the data frame with bytes having the same value on a byte basis. For this purpose, the above condition ii) may be represented as the following conditions: ii-1) the value of the first bit is different from that of the last bit in each byte, and ii-2) the values of the first and fourth bits are respectively different from those of the fifth and eighth bits in each byte (in other words, the first and fourth bits have the same value and the fifth and last bits have the same value).

Figure 6:
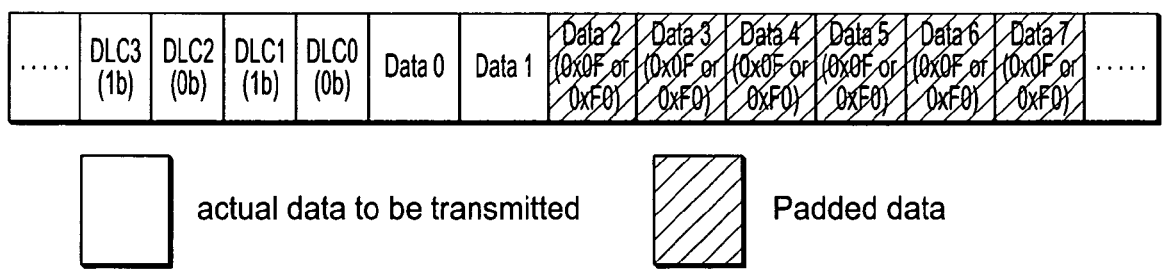
FIG. 6 is a diagram showing an embodiment in which, when data is padded according to the padding policy of the present invention, there are no five or more successive bits having the same value.

For example, as shown in FIG. 6, a value of 0×0F (00001111b) may be a byte that satisfies the conditions ii-1) and ii-2) above and thus can be used for padding, and a value of 0×F0(11110000b) may also be a byte that satisfies the conditions ii-1) and ii-2).

The conditions ii-1) and ii-2) can be a sufficient condition to disable five or more bits having the same value from occurring successively, but are not a necessary condition. For example, when a value of 0×55(01010101b) or 0×33(00110011b) is inserted, the conditions ii-1) and ii-2) are not satisfied even though five or more bits having the same value do not occur successively. Furthermore, the condition i) can be also a sufficient condition, but is not a necessary condition.

Figure 7:
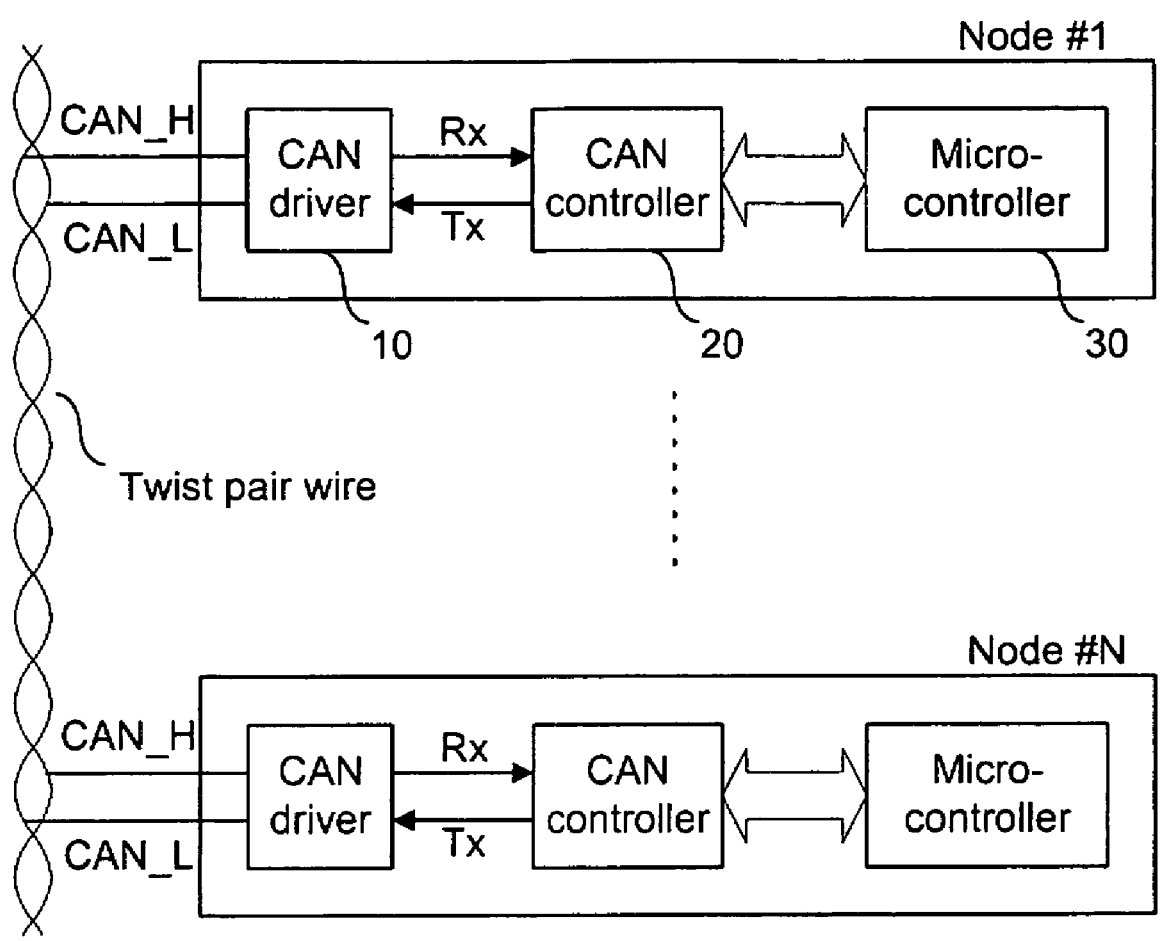
FIG. 7 is a block diagram showing an embodiment of a CAN communication system to which the present invention is applied.

FIG. 7 is a diagram showing an embodiment of a CAN communication system to which the present invention is applied.

Referring to FIG. 7, a plurality of control devices Node #1, . . . , Node #n share a CAN bus, which is provided by the CAN communication system, while performing respective independent functions, and exchange data through the CAN bus. The CAN bus is constructed using twisted pair wires CAN_H and CAN_L (or BUS_A and BUS_B).

Each of the control devices includes a CAN driver 10, a CAN controller 20, and a micro-controller 30. The CAN driver 10 and the CAN controller 20 may be implemented in a single module that performs respective functions. The micro-controller 30 controls the overall operations of corresponding devices, and exchanges data with other control devices through the CAN bus using the CAN controller 20 and the CAN driver 10. All components of the CAN communication system are operatively coupled and configured.

Under the control of the micro-controller 30, the CAN controller 20 converts transmission data, which is output from the micro-controller 30, into a message that conforms to the CAN standard, and outputs the message to the CAN driver 10, or analyzes a CAN message received through the CAN driver 10, extracts data based on the analysis, and outputs the extracted data to the micro-controller 30.

The CAN driver 10 loads the CAN message, which is output from the CAN controller 20, onto the CAN bus, or receives the CAN message loaded onto the CAN bus and outputs the received CAN message to the CAN controller 20.

When converting data into a CAN message and transmitting the CAN message, the CAN controller 20 generates the information (DLC) about the number of bytes of data to be transmitted, and also generates information (CAN ID/priority) about the ID and priority of the control device to receive the data, therefore completing the CAN message consisting of a CAN ID/priority, a data length code, and a data frame.

Furthermore, when receiving the CAN message, the CAN controller 20 determines whether to receive subsequent data based on the CAN ID/priority included in the received CAN message, determines the length (the number of bytes) of a data frame based on the DLC included in the CAN message, and receives a number of bytes of data equal to the number of corresponding bytes.

When seven or fewer bytes of data (data_1) are transmitted via the CAN message, the CAN controller 20 of the present invention uses any code value within the range from b1001 to b1111 (which is not used in the current CAN standard) in the data length code field of the CAN message, and adds dummy data (data_2) to the data (data_1) to be transmitted, thus enabling the total data in the data frame of the CAN message to be 8 bytes long.

In this case, the Most Significant Bit (MSB) of the data length code of the CAN message is '1', and the lower 3 bits thereof have a value corresponding to the number of bytes of the data (data_1) to be transmitted. Furthermore, when the number of bytes of the data (data_1) to be transmitted is n, the number of bytes of the dummy data (data_2) to be added is 8-n, assuming 8 bytes are allotted to a data frame of a CAN message. If, however, another number of bytes (e.g., 10 bytes) are allotted to a data frame of a CAN message, then the dummy data (data_2) that can be added would have 10-n bytes.

Furthermore, when (8-n) bytes of dummy data (data_2) are added, the CAN controller 20 may generate and add bytes of a same value that satisfy both the above condition i) and condition ii), or both the condition i) and conditions ii-1) and ii-2).

When the last bit of data (data_1) to be transmitted is 1b, the CAN controller 20 may add, for example, (8-n) bytes of dummy data corresponding to a value of 0×0F(00001111b). When the last bit of data (data_1) to be transmitted is 0b, the CAN controller 20 adds, for example (8-n) bytes of dummy data corresponding to a value of 0×F0(11110000b).

Furthermore, when a code value of the data length code field of a received CAN message falls within a range from b1001 to b1111, which is not used in the current CAN standard, the CAN controller 20 of the present invention receives an 8-byte data frame in the CAN message, extracts a number of bytes of data corresponding to the value of the lower 3 bits of the data length code from the 8-byte data frame, determines that the remaining data are dummy data, and then ignores the dummy data.

The CAN controller 20 according to the present invention may use any of b0000(0) to b1000(8) as a code value of the length code field of a CAN message, and generate and transmit the CAN message without padding data according to the user's selection data. Furthermore, the CAN controller 20 may use any of b1001(1+Padding 7) to b1111(7+Padding 1) as a code value of the data length code field of a CAN message after having padded data, and generate and transmit the CAN message.

Figure 8:
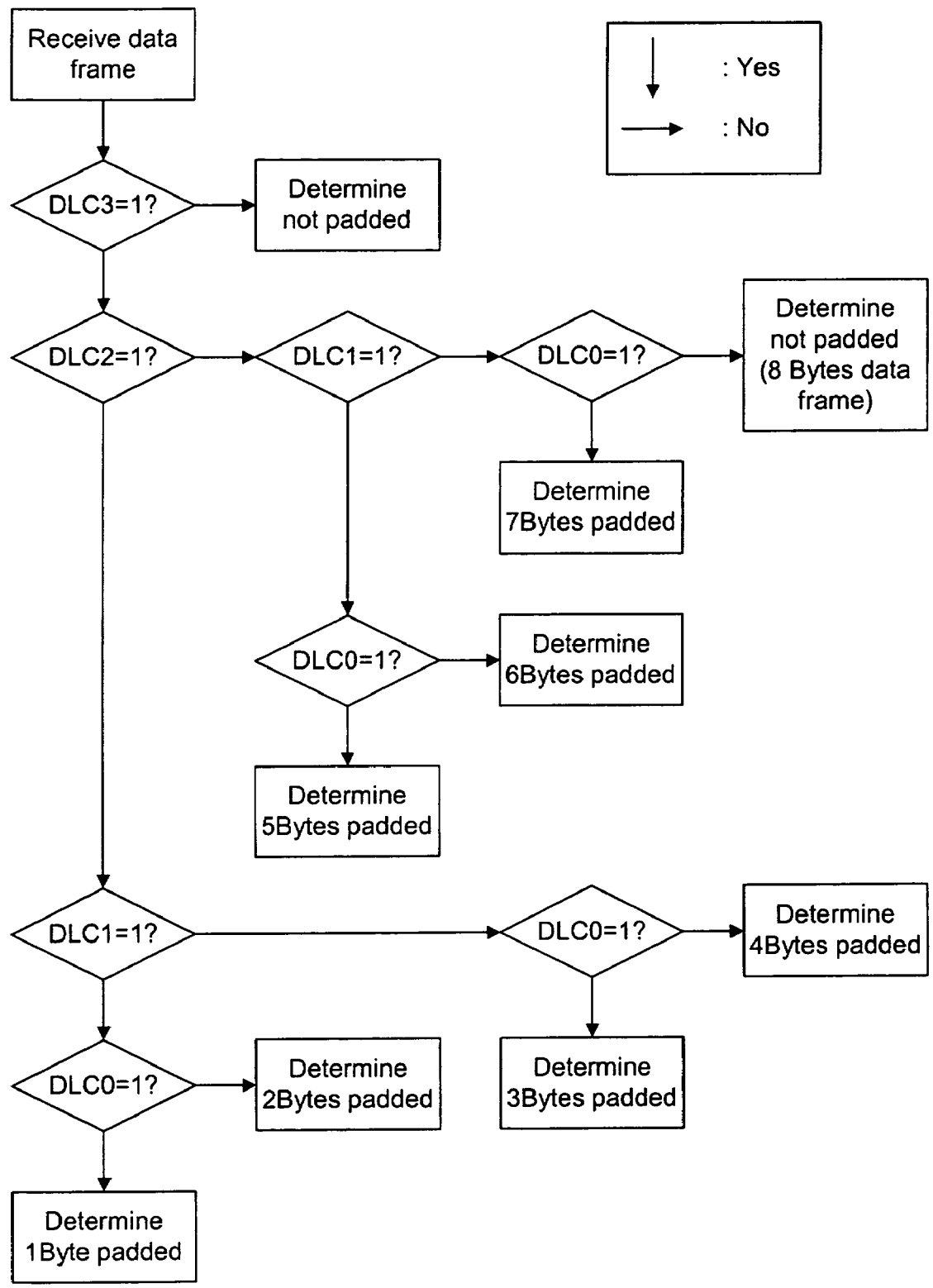
FIG. 8 is a flowchart illustrating an operation of determining the length of actual data and padded dummy data from the CAN message according to the present invention.

FIG. 8 is a flowchart illustrating an operation of determining the length of actual data (i.e., no dummy/padded data) and padded dummy data from the data frame of the CAN message according to the present invention.

Referring to FIG. 8, when a CAN message is received, the CAN controller 20 determines that padding of dummy data has not been performed if the data length code DLC3 (FIG. 3) of the data length code field of the CAN message is not '1', and extracts only a number of bytes of data corresponding to the value of the lower 3 bits (DLC2, DLC1 and DLC0) of the data length code.

If the data length code bit DLC3 is '1' and all of the lower 3 bits DLC2, DLC1 and DLC0 of the data length code are '0', the CAN controller 20 determines that padding of dummy data has not been performed and that the data frame has been constructed to have 8 bytes of actual data.

In contrast, if the data length code bit DLC3 is '1' and at least one of the lower 3 bits DLC2, DLC1 and DLC0 of the data length code is not '0', the CAN controller 20 determines that a number of bytes of the actual data corresponding to the value of the lower 3 bits of the data length code has been included in the data frame, and that bytes of dummy data equal to the remaining number of bytes in the data frame have been padded.

Accordingly, the padding policy according to the present invention is realized using values of data length code fields reserved in the current CAN standard, so that it can be realized without changing a current CAN frame, can ensure the coherence of the transmission time at the time of transmission of CAN frames, and can allow a reception side to predict the length of data to be received. Therefore data processing efficiency at transmitting and receiving ends is improved.

Furthermore, the present invention allows data to be loaded onto the CAN message and to be transmitted using the padding or no-padding policy according to network conditions in a vehicle or according to a user's selection, so that flexible CAN communication can be performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of processing data in a controller area network (CAN), the method comprising:
    adding second data to first data in a CAN message to be transmitted; and
    transmitting information, in a data length code (DLC) of the CAN message, indicating that the second data has been added, wherein a value of bits of the DLC that indicates a length of the second data is greater than a value of bits of the DLC that indicates a length of the first data,
    wherein the second data includes one or more bytes having an identical value, a first bit of the second data has a value different from a last bit of the first data, first and last bits in each byte have different values, first and fifth bits in each byte have different values, and fourth and last bits in each byte have different values,
    wherein the information is included in a field indicating a length of data to be transmitted in the CAN message,
    wherein the information is indicated by a value within a reserved range of the field, and
    wherein the length of the first data corresponds to a value of lower bits that remain after a most significant bit (MSB) is subtracted from a value within the reserved range of the field.

2. The method as set forth in claim 1, wherein a length of the added second data is a value that is determined such that a sum of lengths of the first data and the second data is a predetermined length.

3. The method as set forth in claim 2, wherein the predetermined length is 8 bytes.

4. The method as set forth in claim 2, wherein the second data is data in which there are no five or more successive bits having an identical value.

5. The method as set forth in claim 1, wherein each of the bytes of the second data has a value of 0x0F or 0xF0.

6. A method of processing data in a controller area network (CAN), the method comprising:
    determining a length of first data to be transmitted in a CAN message based on information included in a data length code (DLC) of the received CAN message; and
    receiving the first data corresponding to the determined length,
    wherein, when the information indicates that second data has been added to the first data, the method further comprises the step of extracting data except the second data from the received first data, and a value of bits of the DLC that indicates a length of the second data is greater than a value of bits of the DLC that indicates a length of the first data,
    wherein the second data includes one or more bytes having an identical value, a first bit of the second data has a value different from a last bit of the first data, first and last bits in each byte have different values, first and fifth bits in each byte have different values, and fourth and last bits in each byte have different values,
    wherein the information is included in a field indicating a length of data to be transmitted in the CAN message,
    wherein the information is indicated by a value within a reserved range of the field, and
    wherein the length of the first data corresponds to a value of lower bits that remain after a most significant bit (MSB) is subtracted from a value within the reserved range of the field.

7. The method as set forth in claim 6, wherein, when the information indicates that the second data has been added to the first data, the second data has a length that causes a sum of the first and second data to have a length of 8 bytes.

8. An apparatus for processing data in a controller area network (CAN), the apparatus comprising:
    a CAN controller configured to generate a CAN message including data to be transmitted and transmit the generated CAN message through a CAN bus, or receive the CAN message transmitted through the CAN bus and extract data from the received CAN message; and
    a micro-controller configured to transmit data through the CAN controller, or to perform operational control of corresponding devices using the data extracted from the received CAN message,
    wherein, the CAN controller selectively adds second data to first data when transmitting the first data in the CAN message, and transmits information, in a data length code (DLC) of the CAN message, indicating that the second data has been added in the CAN message when adding the second data to the first data, and a value of bits of the DLC that indicates a length of the second data is greater than a value of bits of the DLC that indicates a length of the first data,
    wherein the second data includes one or more bytes having an identical value, a first bit of the second data has a value different from a last bit of the first data, first and last bits in each byte have different values, first and fifth bits in each byte have different values, and fourth and last bits in each byte have different values, wherein the information is included in a field indicating a length of data to be transmitted in the CAN message, and is indicated by a value within a reserved range of the field, and wherein the length of the first data corresponds to a value of lower bits that remain after a most significant bit (MSB) is subtracted from a value within the reserved range of the field.

9. The apparatus as set forth in claim 8, wherein a length of the added second data is a value that is determined such that a sum of lengths of the first data and the second data is 8 bytes.

10. The apparatus as set forth in claim 9, wherein the second data is data in which there are no five or more successive bits having an identical value.

11. An apparatus for processing data in a controller area network (CAN), the apparatus comprising:
- a CAN controller configured to generate a CAN message including data to be transmitted and transmit the generated CAN message through a CAN bus, or to receive the CAN message transmitted through the CAN bus and extract data from the received CAN message; and
- a micro-controller configured to transmit data through the CAN controller, or to perform operational control of corresponding devices using the data extracted from the received CAN message,
- wherein the CAN controller determines a length of first data to be transmitted in the CAN message based on information included in a data length code (DLC) of the received CAN message, receives a number of bytes of the first data equal to the determined length, when the information indicates that second data has been added to the first data, extracts data except the second data from the received first data, and a value of bits of the DLC that indicates a length of the second data is greater than a value of bits of the DLC that indicates a length of the first data,
- wherein the second data includes one or more bytes having an identical value, a first bit of the second data has a value different from a last bit of the first data, first and last bits in each byte have different values, first and fifth bits in each byte have different values, and fourth and last bits in each byte have different values,
- wherein the information is included in a field indicating a length of data to be transmitted in the CAN message, and is indicated by a value within a reserved range of the field, and
- wherein a length of the extracted data corresponds to a value of lower bits that remain after a most significant bit (MSB) is subtracted from a value within the reserved range of the field.

12. The apparatus as set forth in claim 11, wherein, when the information indicates that the second data has been added to the first data, the second data has a length that causes a sum of the first and second data to have a length of 8 bytes.

13. The method as set forth in claim 1, wherein the DLC is not included in a data frame of the CAN message.

14. The method as set forth in claim 6, wherein the DLC is not included in a data frame of the CAN message.

15. The apparatus as set forth in claim 8, wherein the DLC is not included in a data frame of the CAN message.

16. The apparatus as set forth in claim 11, wherein the DLC is not included in a data frame of the CAN message.

* * * * *